July 20, 1926. Re. 16,387
S. W. CARTER
PROPELLER
Original Filed Oct. 2, 1922 2 Sheets-Sheet 1
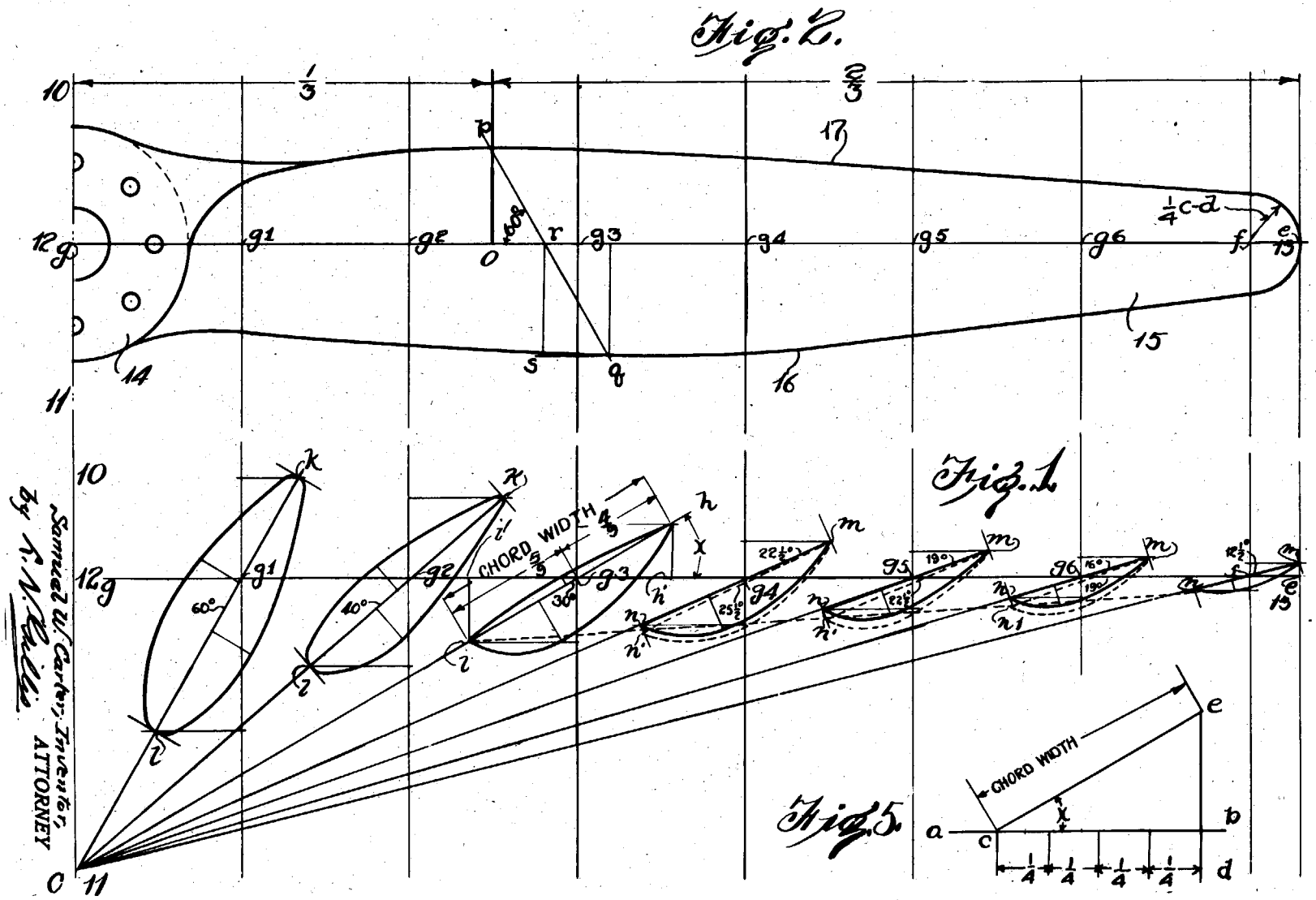

July 20, 1926. Re. 16,387
S. W. CARTER
PROPELLER
Original Filed Oct. 2, 1922 2 Sheets-Sheet 2
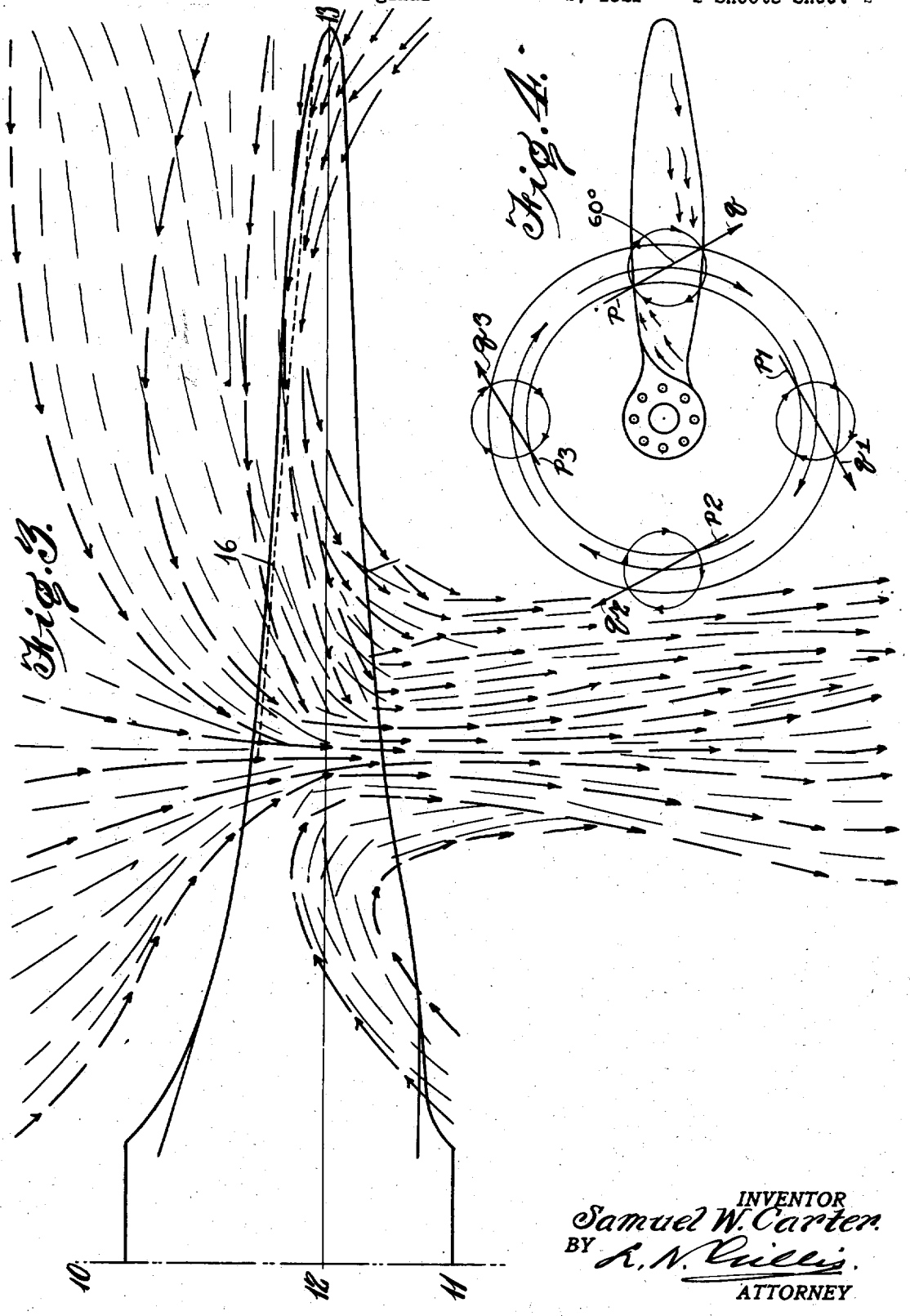
INVENTOR
Samuel W. Carter.
BY R. N. Quiller.
ATTORNEY Reissued July 20, 1926. Re. 16,387

UNITED STATES PATENT OFFICE.

SAMUEL W. CARTER, OF WASHINGTON, DISTRICT OF COLUMBIA.

PROPELLER.

Original No. 1,471,590, dated October 23, 1923, Serial No, 591,927, filed October 2, 1922. Application for reissue filed March 23, 1926. Serial No. 96,890.

This invention relates to propellers and has special reference to the design and construction of propeller blades.

More particularly the invention relates to an improved method of designing propeller blades and to a blade constructed in accordance with such method.

Heretofore it has not been considered that there was any particular relation between the points on the leading edge of the blade furthest from the horizontal line passing through the center of the hub in the elevational aspect of the blade and the similar points on the trailing edge.

I have discovered that, in order to obtain a maximum efficiency, a certain very definite relation exists between these points. Furthermore, I have discovered that a certain very definite relation exists in the location in distance from the center of the hub to these points and that whenever such relationships are departed from to any material extent there is a corresponding loss of efficiency in the propeller. The reason for this is that, when proper cambers are given to the inner and outer portions of the blade a fluid stream will travel from the tip of the blade towards the hub and another stream will travel from the hub toward the tip. Now, if the points in question are in proper relationship these two opposing fluid streams will operate to produce a vortex circle or cyclone action at their junction so that rearward flow of the two streams tends to be obtained without dispersion, and thus the reaction on the propeller blade becomes very great whereby the propulsive effect is greatly enhanced.

One important object of the present invention is to furnish a key for and to provide a standard method of laying out a propeller blade whereby to determine the location of these points or apices on the leading and trailing edges of the blades in their proper relation to the center of the hub and to each other.

A second very important object of the invention is the provision of a propeller blade so constructed that the apices of the leading and trailing edges will bear definite relation to each other and to the center of the hub or axis of rotation of such propeller.

It has also been customary in the design of propellers, to so shape the various blade sections that the rearward moving fluid current from a rotating propeller would be concentrated as nearly as possible around the locus of the sixty-fifth radial point or approximately two thirds of the distance from the center of the hub to the tip of the blade. I have discovered that a more highly efficient propeller is produced when the locus of the concentration center or center of thrust is traced by the path of the forty-eighth radial point, the center of thrust being thus moved inwardly from its usual relation to the tip of the blade and the rearwardly extending fluid current from the blade of the propeller takes the form of a compressed or condensed vortex circle located at a certain distance from the axis of rotation of the propeller. The advantage of this lies principally in the fact that the stresses are removed from the tip portion of the blade where it is thinnest and the reaction is concentrated in the strong portion of the blade, and the fluid stream set up by the blade does not tend to disperse. This action is obtained by properly arranging the cambers of the inner and outer portions of the blades and designing the propeller, in a manner hereinafter described, so that certain relationships exist between the cooperative points on the leading and trailing edges.

A third important object of the invention is to provide a method of design wherein the proper condensing features of this vortex circle may be obtained.

A fourth important object of the invention is to provide a propeller so constructed that the air or other fluid will have a slip along the blade from the center or axis of rotation outward with relation to the inner portion of the blade and inward from the tip with relation to the outer portion of the blade.

With the above and other objects in view as will be hereinafter apparent, the invention consists in general of certain novel details of construction and combinations of parts, hereinafter fully described, illustrated in the accompanying drawings and specifically claimed.

In the accompanying drawings like characters of reference indicate like parts in the several views, and:—

Figure 1 is a layout of cross sections of a propeller blade constructed in accordance with this invention and showing the manner of changing from constant pitch used herein.

Figure 2 is a face elevation of one half of a propeller constructed in accordance herewith.

Figure 3 is a plan view of such a half propeller and showing the flow of air currents.

Figure 4 is a diagrammatic face view showing the travel of the center of thrust, vortex circle, and the main cooperating points on the leading and trailing edges about the axis of the propeller.

Figure 5 is a diagram to the same scale as Figures 1 and 2, the diagram showing the manner of getting the tip dimensions.

In laying out a propeller blade constructed in accordance with my invention certain features are calculated in the ordinary manner. These features are based on the horsepower of the engine, the number of revolutions per minute of the propeller shaft and the speed desired to be obtained. From these factors the proper pitch angle at a certain distance from the center of the propeller and which I preferably term the key pitch angle can be determined as can also the proper chord width of the propeller blade at the key pitch angle point and the diameter of such propeller, that is to say the diameter of the circle swept by the extreme tip points of the blade.

Having determined by calculation the chord distance and the key pitch angle, the next step is to determine the width of the tip of the blade. To do this a suitable line is drawn of indefinite length as for instance the line *a—b* of Figure 5. From a point on this line a line *c—e* is laid off at an angle *x* corresponding to the key pitch angle, the line *c—e* being made equal in length to the chord width of the blade as calculated. The angular line *c—e* is now projected on the line *a—b*, the projected line being shown at *c—d* and this projected line is divided into four equal parts. Two of these parts give the width of the tip as will be presently understood.

A perpendicular line 10—11 is now drawn and from a suitable point on this line there is drawn a horizontal line 12—13. The length of the line 12—13 is made equal to one half the diameter of the propeller and from the point 13, there is laid off toward the point 12 a distance *e—f* equal to one-fourth of the distance *c—d* as previously determined. This leaves a remaining distance *f—g* which is divided into a suitable number of equal parts preferably seven as indicated at the points $g^1$, $g^2$, $g^3$, $g^4$, $g^5$, $g^6$ and *f*. Through the point $g^3$ is drawn a chord line *h—i* which is prolonged until it intersects the line 10—11 as at the point C. This point is the center or the layout of the primary chord lines of all the blade cross sections. On the line *h—i* is laid out the calculated chord width, which is divided into nine equal parts, four-ninths of this width being above the line 12—13 and the remaining five-ninths being below the line 12—13. Through the points $g^1$, $g^2$, $g^4$, $g^5$, $g^6$ and *f* are drawn other chord lines, and these chord lines at the point $g^1$ and $g^2$ are represented by the lines *k—l* and at the remaining points by the lines *m—n*. The propeller face, and back cambers are determined by calculation in the usual manner, and the primary cross sections are completed as in Figure 1, it being noted that all of the primary chord lines may be prolonged to pass through point C. Thus these primary chord lines, if adhered to, would give a blade of uniform pitch, but for the purpose of this invention this pitch is progressively varied from the cross section at $g^3$ to cross section at *f* and this variation is accomplished as follows:

From the point *i* a line is drawn to the point *n* of the cross section at *f*, this line being shown as the dotted line *i—n*. Each of the blade cross sections at the points $g^4$, $g^5$ and $g^6$ is then swung about their respective points *m* until the point *n* of that cross section strikes the dotted line *i—n*, the final cross sections being indicated by the dotted lines at the stations $g^4$, $g^5$ and $g^6$. We now have a complete set of cross sections for the blade, and it will be noted that the chord at the station $g^4$ is nearly equal in length to the chord at the station $g^3$, this being for the purpose of maintaining a sufficient thrust area at the main part of the blade since the main part of the thrust curves in and is compressed in this neighborhood. The chord at the station $g^5$ is slightly more than three-fourths of the chord width at the station $g^3$, while the chord at the station $g^6$ is one-half of the sum of the chords at the stations $g^5$ and *f*, the latter being one-half of the key chord width *h—i* at the station $g^3$. Moreover, the chords at the stations $g^4$, $g^5$, $g^6$ and *f* are all disposed in their primary positions with four-ninths of the chord width above the line 12—13 and five-ninths below the line 12—13 exactly as with the key chord. At the station $g^2$ these proportions change to about eleven-twentythirds above and twelve-twentythirds below said lines, the chord width being somewhat over one and one-fourth times the key chord width. At the station $g^1$ there are preferably eleven parts above and fifteen below and the chord width is about one and five-eighths of the key chord width. The proportions at the stations $g^1$ and $g^2$ may be varied somewhat to suit the hub dimensions.

It is to be noted that the surface 15 of the face of the blade in the lower half of the blade or area between the stations $g^3$ and $f$ as a top line and the straight line $i$—$n$ as a bottom line is a plane surface.

To obtain a view of the blade in its elevational aspect as shown in Figure 2 we again draw the line 10—11 and horizontal line 12—13, and at a point $o$ which is one-third of the distance from the intersection or center of the hub 14 of the propeller to the tip of the blade 13, a perpendicular $o$—$p$ is erected on the line 12—13. The distance $g^3$—$h$ is then projected on the lines 12—13 of Figure 1 as at $g^3$—$h'$ and the line $o$—$p$ is made equal in length to the distance $g^3$—$h'$. From the point $p$ a line $p$—$q$ is drawn which is inclined toward the tip of the blade and intersects the line 12—13 at sixty degrees. At the point of the intersection $r$ a line $r$—$s$ is drawn perpendicular to 12—13 and this line is made equal in length to the projection of the line $g^3$—$i$ on the line 12—13 or in other words to $g^3$—$i'$ from the point $s$, a horizontal line $s$—$q$ is drawn intersecting the line $p$—$q$. These points $q$ and $p$ are the apex points of the leading and trailing edges 16 and 17 respectively of the propeller blade. The remaining chords of the cross sections in Figure 1 are now projected on the line 12—13 and are laid off on lines projecting through the station points in Figure 2 corresponding to those in Figure 1, perpendicular lines to the line 12—13 being laid out at these points. Due to the fact cross sections from the station $g^5$ to the station $f$ decrease in chord regularly the leading and trailing edges 17 and 16 between these cross section stations will be straight lines fairing into the tip curve and the tip of the blade will be a semi-circle having a radius $e$—$f$. It will be understood that by reason of the chord width the station $g^4$ being nearly equal to the chord width at station $g^3$ the elevational aspect of this part of the propeller will be almost a rectangle with slightly curved lines at the leading and trailing edges, said curves near the hub being faired into the hub as shown in this Figure 2.

The plan view (Fig. 3) of the propeller is obtained in a similar manner, the lines 10—11 and 12—13 being drawn and the station points being laid out as in the other Figure 2. The leading and trailing edges are as indicated at 16 and 17 and in this view it will be noted that the course of the air currents is such that slip will take place from the hub outwardly and from the tip inwardly so that a vortex will be formed substantially at the forty-eighth radial point from the hub.

With reference to the points $p$ and $q$ experience has shown that while a certain variation may be allowed in the proportionate distance of the points $o$—$p$ the angle of the line $p$—$q$ must be closely adhered to and the distance in elevational aspects from the line 12—13 must be also closely-adhered to in order to obtain the maximum efficiency.

With relation to the cambers shown it will be obvious that these cambers are designed in a manner based on the old and well known principles and vary in accordance with the uses to which different propellers are to be put. For instance, the cambers in the propeller for a heavy freight carrying aeroplane, such as a bombing plane, will be different from the cambers in a propeller for a light speed aeroplane such as a scout.

Furthermore, it will be observed that from these laid-off blade sections the width of the blade at various points in elevation can be obtained and these widths are laid off above and below a horizontal center line on the elevation at corresponding points in the same proportions as the maximum widths, that is to say, in the proportions of $\frac{5}{8}$ to $\frac{4}{9}$ of the respective widths.

It will be observed that the displacement of the points on the leading edge outwardly from the center with respect to the corresponding points on the trailing edge can be mathematically calculated as the displacement in any case is equal to four-ninths of the width at the point multiplied by the tangent of the selected angle preferably the tangent of 60 degrees, for example, if the width at the points be four inches the displacement of the point along the leading edge will be 1.73 x 4 inches, or 6.92.

By this method it is possible to quickly lay out the proper points and when these points are so laid the propeller constructed in accordance therewith is of very high efficiency, tests having shown an efficiency of 95%.

By reference to Figure 4 is will be seen that the points $p$ and $q$ travel in circular orbits $p$, $p^1$, $p^2$, $p^3$ and $q$, $q^1$, $q^2$, $q^3$ respectively and, as can be seen by the various positions of the arrow $p$—$q$ these points revolve about a common center as the blade rotates and also the flow of air due to the camber of the blade is inwardly from the blade tip toward the point $q$ and outwardly from the hub towards the point $p$ thus producing vortical motion as indicated by the arrow heads on the circles drawn through these points so that the resultant action of the blade is to produce a helical thrust stream having vortical motion.

Having thus described the invention, what is claimed as new, is:

1. That method of determining the apex points of the leading and trailing edges of propeller blades which consists in determining the length and maximum width in elevation of the desired blade, describing the vertical and horizontal center lines of the elevation of the propeller, erecting a perpendicular at a point on the horizontal center line a predetermined distance from the vertical center line, dividing the predetermined width into a number of equal fractional parts, laying off on the perpendicular a predetermined number of said parts to determine the apex point of the curve of the trailing edge of the blade, laying off a line from said apex point inclined at a predetermined angle to the horizontal center line and crossing the same, measuring the remainder of the width downward from said horizontal center line perpendicularly thereto to determine the distance from said horizontal center line of the apex point of the leading edge and laying off a line at such distance through the angular line to determine by the intersection of said lines said apex point.

2. That method of determining the apex points of the leading and trailing edges of propeller blades which consists in determining the required length and maximum width of the blade in elevation, describing the vertical and horizontal center lines of the propeller, erecting a perpendicular on the horizontal center line one-third the length of the blade from the vertical center line, laying off a point on the perpendicular at a distance equal to four-ninths the said width from the horizontal center line, the point thus determined being the apex point of the trailing edges, laying off a line through said point and extending outwardly and crossing the horizontal center line at an angle of sixty degrees, and determining a point on said line five-ninths of said width below the horizontal center line to constitute the apex point of the leading edge.

3. That method of laying out propeller blades which consists in determining the apex points of the leading and trailing edges of the blade by determining the length and maximum width in elevation of the desired blade, describing the vertical and horizontal center lines of the elevation of the propeller, erecting a perpendicular at a point on the horizontal center line a predetermined distance from the vertical center line, dividing the predetermined width into a number of equal fractional parts, laying off on the perpendicular a predetermined number of said parts to determine the apex point of the curve of the trailing edge of the blade, laying off a line from said apex point inclined at a predetermined angle to the horizontal center line and crossing the same, measuring the remainder of the width downward from said horizontal center line perpendicularly thereto to determine the distance from said horizontal center line of the apex point of the leading edge, laying off a line at such distance through the angular line to determine by the intersection of said lines, said apex points determining the widths in elevation of the blade at a number of other points in its length, laying off, and dividing each of said widths into the same number of fractional parts as the first mentioned width, utilizing a number of the fractional parts of each width equal in number to the fractional part of the maximum width used in determining the respective apex points to determine points on the respective edges opposite the points at which the last mentioned widths are determined.

4. That method of laying out propeller blades which consists in determining the apex points of the leading and trailing edges of the blade by determining the required length and maximum width of the blade in elevation, describing the vertical and horizontal center lines of the propeller, erecting a perpendicular on the horizontal center line one-third the length of the blade from the vertical center line, laying off a point on the perpendicular at a distance equal to four-ninths the said width from the horizontal center line, the point thus determined being the apex point of the trailing edge, laying off a line through said point and extending outwardly and crossing the horizontal center line at an angle of sixty degrees determining a point on said angular line distant perpendicularly five-ninths of said width from the horizontal center line, said last point being the apex point of the leading edge, determining the widths in elevation of the blade at a number of points in its length, laying off at each of said points four-ninths of the respective width to determine trailing edge points and five-ninths of said width to determine leading edge points.

5. A propeller blade having the apex point of its trailing edge at a predetermined distance from the center of rotation of the propeller and the apex point of its leading edge located further from the center by an amount approximately equal to a predetermined fraction of the greatest width of the blade in elevation multiplied by the tangent of an angle formed by a line passing through the point on the trailing edge and having a predetermined angular relation with the center line of the blade, the angle being that between said line and the center line.

6. A propeller blade having the apex point of its trailing edge located at a distance from the center of the propeller equal to one-third the distance from said center to the tip of the blade and the apex point of its leading edge located further from the center by a distance equal to a predetermined fraction of the greatest width of the blade in elevation multiplied by the tangent of sixty degrees.

7. A propeller blade having the apex point of its trailing edge at a predetermined distance from the center of rotation of the propeller and the apex point of its leading edge located further from the center by an amount approximately equal to a predetermined fraction of the greatest width of the blade in elevation multiplied by the tangent of a predetermined angle, said angle being that between a line passing through the point on the trailing edge and the center line of the blade in predetermined angular relation to said center line, said apex point of the leading edge being located in predetermined fractional part of the maximum width of the propeller on one side of the center line of the blade in elevational aspect and the apex point of thet railing edge being located the remainder of the greatest elevational width on the other side of said line.

8. A propeller blade having the apex point of its trailing edge located at a distance from the center of the propeller equal to one-third the distance from said center to the tip of the blade and the apex point of its leading edge located further from the center by a distance equal to the greatest width of the blade in elevation multiplied by the tangent of sixty degrees, said apex point of the trailing edge being located at $\frac{4}{9}$ the maximum width of the blade in elevation from the horizontal center line of the blade in elevational aspect and the apex point of the leading edge being located $\frac{5}{9}$ of said maximum width on the other side of said center line.

9. A propeller blade having the apex point of its trailing edge at a predetermined distance from the center of rotation of the propeller and the apex point of its leading edge located further from the center by an amount approximately equal to a predetermined fraction of the greatest width of the blade in elevation multiplied by the tangent of a predetermined angle, said angle being that between a line passing through the point on the trailing edge and the center line of the blade in predetermined angular relation to said center line, said apex point of the leading edge being located a predetermined fractional part of the maximum width of the propeller on one side of the center line of the blade in elevational aspect and the apex point of the trailing edge being located the remainder of the greatest elevational width on the other side of said line, the remaining points on said leading and trailing edges being located in corresponding pairs at distances on opposite sides of said center line proportionate to the distance of the apex points.

10. A propeller blade having the apex point of its trailing edge located at a distance from the center of the propeller equal to one-third the distance from said center to the tip of the blade and the apex point of its leading edge located further from the center by a distance equal to the greatest width of the blade in elevation multiplied by the tangent of sixty degrees, said apex point of the trailing edge being located at $\frac{4}{9}$ the maximum width of the blade in elevation from the horizontal center line of the blade in elevational aspect and the apex point of the leading edge being located $\frac{5}{9}$ of said maximum width on the other side of said center line, the remaining points on said leading and trailing edges being located in corresponding pairs at distances on opposite sides of said center line proportionate to the distances of the apex points.

11. A propeller blade including an inner and an outer portion, said inner portion being cambered to cause slip of the fluid on which the blade acts in an outward direction and the outer portion being shaped to cause slip inwardly of the blade of said fluid, said blade being further shaped to produce a vortex at the junction of said inner and outer blade portions.

12. A propeller blade including an inner and an outer portion, said inner lower portion being cambered to cause slip of the fluid on which the blade acts in an outward direction and the outer portion being shaped to cause slip inwardly of the blade of said fluid, said inner and outer portions being respectively $\frac{1}{3}$ and $\frac{2}{3}$ the length of the blade.

13. A propeller blade having an angle of attack greater than 45 degrees adjacent its inner end and an angle of attack less than 45 degrees at its outer end, the angle of attack varying progressively from one end of the blade to the other whereby the angle of attack at one point equals 45 degrees, said blade having the outer portion beyond the said point shaped to direct a fluid stream inwardly along the blade and having the inner portion shaped to direct a fluid stream outwardly along the blade whereby said streams meet at approximately said point.

14. A propeller blade having an angle of attack greater than 45 degrees adjacent its inner end and an angle of attack less than 45 degrees at its outer end, the angle of attack varying progressively from one end of the blade to the other whereby the angle of attack at one point equals 45 degrees, said blade having the outer portion beyond the said point shaped to direct a fluid stream inwardly along the blade and having the inner portion shaped to direct a fluid stream outwardly along the blade whereby said streams meet at approximately said point, said inner and outer blade portions being further shaped to cause formation of a fluid vortex at the point of meeting of the fluid streams.

15. A propeller blade having at one point in its length and adjacent its tip constant pitch cross sections, the leading edge of the blade between such cross sections being a straight line, the cross sections between said cross sections having contours identical in form and dimensions with constant pitch cross sections at the points at which they are taken, each of said cross sections being positioned in such angular displacement about the cross section point on the trailing edge as to bring the cross section point on the leading edge on said straight line.

16. A propeller blade having the inner portion of the blade of uniform pitch and the outer portion of the blade of varying pitch, the pitch of the inner portion being such as to force air outwardly along the blade and the varying pitch of the outer portion being such as to force air inwardly from the tip toward the center of the propeller.

17. A propeller blade having its inner portion shaped to force air outwardly toward a point on its trailing edge and having its outer portion shaped to force air inwardly toward a point on its leading edge spaced more remotely from the center of the propeller than the first point, the inner portion of the blade being of uniform pitch and the outer portion being of gradually varying pitch, the face of the outer portion of the blade adjacent the leading edge being a plane surface.

18. A propeller blade having on its leading edge an apex point or point of greatest distance from the center line of the blade in elevational aspect, and a similar apex point on its trailing edge, the apex point on its leading edge being more remote from the axis of the propeller than the apex point of the trailing edge whereby the orbit of the first point is greater than the orbit of the second point and said points revolve around each other as the propeller revolves.

19. A propeller blade having on its leading edge an apex point or point of greatest distance from the center line of the blade in elevational aspect, and a similar apex point on its trailing edge, the apex point on its leading edge being more remote from the axis of the propeller than the apex point of the trailing edge whereby the orbit of the first point is greater than the orbit of the second point and said points revolve around each other as the propeller revolves, said blade being of varying pitch in its outer part to produce inward flow of the air from the tip of the blade toward the first point, and cambered to produce the outward flow of the air from the hub toward the second point.

20. A propeller blade having on its leading edge an apex point or point of greatest distance from the center line of the blade in elevational aspect, and a similar apex point on its trailing edge, the apex point on its leading edge being more remote from the axis of the propeller than the apex point of the trailing edge whereby the orbit of the first point is greater than the orbit of the second point and said points revolve around each other as the propeller revolves, said second point being at substantially one-third the distance from the hub to the tip of the propeller.

21. A propeller blade having on its leading edge an apex point or point of greatest distance from the center line of the blade in elevational aspect, and a similar apex point on its trailing edge, the apex point on its leading edge being more remote from the axis of the propeller than the apex point of the trailing edge whereby the orbit of the first point is greater than the orbit of the second point and said points revolve around each other as the propeller revolves, said second point being at substantially one-third the distance from the hub to the tip of the propeller, said blade being of varying pitch in its outer part to produce inward flow of air from the tip of the blade toward the first point, and cambered to produce the outward flow of the air from the hub toward the second point.

22. A propeller blade having on its leading edge an apex point or point of greatest distance from the center line of the blade in elevational aspect, and a similar apex point on its trailing edge, the apex point on its leading edge being more remote from the axis of the propeller than the apex point of the trailing edge whereby the orbit of the first point is greater than the orbit of the second point and said points revolve around each other as the propeller revolves, said second point being at substantially one-third the distance from the hub to the tip of the propeller, the first point being on a line drawn at 60 degrees to the center line of the blade and passing through the second point.

23. A propeller blade having on its leading edge an apex point or point of greatest distance from the center line of the blade in elevational aspect, and a similar apex point on its trailing edge, the apex point on its leading edge being more remote from the axis of the propeller than the apex point of the trailing edge whereby the orbit of the first point is greater than the orbit of the second point and said points revolve around each other as the propeller revolves, said second point being at substantially one-third the distance from the hub to the tip of the propeller, the first point being on a line drawn at 60 degrees to the center line of the blade and passing through the second point, said blade being of varying pitch in its outer part to produce inward flow of air from the tip of the blade toward the first point, and cambered to produce the outward flow of the air from the hub toward the second point.

In witness whereof I hereunto affix my signature.

SAMUEL W. CARTER.